US010819832B2

(12) United States Patent
Xu et al.

(10) Patent No.: US 10,819,832 B2
(45) Date of Patent: Oct. 27, 2020

(54) PACKET PROCESSING METHOD, APPARATUS, AND DEVICE

(71) Applicant: Huawei Technologies Co., Ltd., Shenzhen (CN)

(72) Inventors: Yibin Xu, Nanjing (CN); Bing Sun, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 15/344,193

(22) Filed: Nov. 4, 2016

(65) Prior Publication Data
US 2017/0134541 A1   May 11, 2017

(30) Foreign Application Priority Data

Nov. 6, 2015 (CN) .......................... 2015 1 0752291

(51) Int. Cl.
*H04L 29/06* (2006.01)
*H04L 12/823* (2013.01)
(Continued)

(52) U.S. Cl.
CPC .............. *H04L 69/22* (2013.01); *H04L 47/32* (2013.01); *H04L 63/08* (2013.01);
(Continued)

(58) Field of Classification Search
CPC ....... H04L 47/32; H04L 63/08; H04L 67/303; H04L 69/22; H04L 63/0876; H04L 47/50; H04L 45/00; H04L 63/162
See application file for complete search history.

(56) References Cited

U.S. PATENT DOCUMENTS 6,742,016 B1 *  5/2004  Bhoj ....................... H04L 47/15
                                                              370/234
8,516,556 B2   8/2013  MacNider et al.
(Continued)

FOREIGN PATENT DOCUMENTS

CN        1522020 A      8/2004
CN      100484130 C      4/2009
(Continued)

OTHER PUBLICATIONS

"IEEE Standard for Local and Metropolitan area networks; Port-Based Network Access Control," IEEE Computer Society, IEEE Std 802.1X-2010, XP68098968, Institute of Electrical and Electronics Engineers, New York, New York (Feb. 5, 2010).

*Primary Examiner* — Mandish K Randhawa
(74) *Attorney, Agent, or Firm* — Leydig, Voit & Mayer, Ltd.

(57) ABSTRACT

A packet processing method, apparatus, and device are disclosed. The method includes: receiving, by a forwarding plane, an item from a control plane of the forwarding plane, where the item includes an identifier of a connected terminal; receiving an access protocol packet; when the access protocol packet is not an authentication start packet, determining, by the forwarding plane according to the identifier of the connected terminal, whether a terminal served by the access protocol packet is the connected terminal; and discarding, by the forwarding plane, the access protocol packet when the access protocol packet is not the authentication start packet and when the terminal served by the access protocol packet is not the connected terminal. The method improves user experience.

9 Claims, 2 Drawing Sheets

(51) Int. Cl.
  *H04L 29/08*   (2006.01)
  *H04L 12/701*   (2013.01)
  *H04L 12/863*   (2013.01)

(52) U.S. Cl.
  CPC ........ *H04L 63/0876* (2013.01); *H04L 67/303* (2013.01); *H04L 45/00* (2013.01); *H04L 47/50* (2013.01); *H04L 63/162* (2013.01)

(56) References Cited

U.S. PATENT DOCUMENTS

| | | | |
|---|---|---|---|
| 8,666,786 B1 | 3/2014 | Wirz et al. | |
| 2005/0270976 A1* | 12/2005 | Yang | H04L 12/5602 370/229 |
| 2006/0146752 A1* | 7/2006 | Jang | H04L 63/08 370/331 |
| 2007/0274290 A1 | 11/2007 | Takahashi et al. | |
| 2013/0031605 A1* | 1/2013 | Huston, III | H04L 63/1458 726/3 |

FOREIGN PATENT DOCUMENTS

| | | |
|---|---|---|
| CN | 104579994 A | 4/2015 |
| CN | 105450652 A | 3/2016 |

\* cited by examiner

Format of an EAPOL packet

| Port Access Entity Ethernet type ||
|---|---|
| Protocol version | Type |
| Length ||
| Packet body ||

PACKET PROCESSING METHOD, APPARATUS, AND DEVICE

CROSS-REFERENCE TO RELATED APPLICATION

This application claims priority to Chinese Patent Application No. 201510752291.4, filed on Nov. 6, 2015, which is hereby incorporated by reference in its entirety.

TECHNICAL FIELD

This application relates to the field of communications technologies, and in particular, to a packet processing method, apparatus, and device.

BACKGROUND

Generally, user authentication may need to be completed on an authentication device before a terminal accesses a network. The terminal can access the network (which is also referred to as going online) only after completing the user authentication. The terminal also communicates with the authentication device when being online and when exiting from the network accessed by the terminal (which is also referred to as going offline).

The terminal or an authentication server communicates with the authentication device by using an access protocol. A common access protocol includes a portal protocol, the Point-to-Point Protocol over Ethernet (PPPoE), and the Extensible Authentication Protocol over local area network (EAPOL). The portal protocol is a protocol in a solution used when a local area network service is provided by means of web authentication, and includes the Password Authentication Protocol (PAP) and the Challenge Handshake Authentication Protocol (CHAP).

At present, to prevent a central processing unit (CPU) from being attacked, when a rate at which access protocol packets are received reaches a preset upper limit, the authentication device restricts the rate. A specific restriction measure is that an access protocol packet is discarded randomly.

After the packet is discarded randomly, service quality of a provider is affected. As a result, user service experience is poor.

SUMMARY

To resolve a problem that user service experience is poor due to random discarding of a packet, this application provides a packet processing method, apparatus, and device.

According to a first aspect, a packet processing method is provided, where the method includes:

receiving, by a forwarding plane, an item from a control plane of the forwarding plane, where the item includes an identifier of a connected terminal;

receiving, by the forwarding plane, an access protocol packet;

when the forwarding plane determines that the access protocol packet is not an authentication start packet, determining, by the forwarding plane according to the identifier of the connected terminal, whether a terminal served by the access protocol packet is the connected terminal, where the authentication start packet is an authentication packet that is used to start an authentication process for a terminal served by the authentication start packet; and discarding, by the forwarding plane, the access protocol packet when the access protocol packet is not the authentication start packet and the terminal served by the access protocol packet is not the connected terminal.

The forwarding plane may obtain the identifier of the connected terminal by receiving the item from the control plane. Because an access protocol packet serving a to-be-newly-connected terminal can be only an authentication start packet, when the access protocol packet is not the authentication start packet and the terminal served by the access protocol packet is not the connected terminal, the forwarding plane may determine that the access protocol packet is an error packet or an attack packet, and discard the access protocol packet. Compared with random discarding of a packet, this method not only reduces processing burden on the control plane, but also avoids undesirable impact on a user, and therefore, user service experience can be improved.

With reference to the first aspect, in first implementation of the first aspect, the method further includes:

placing, by the forwarding plane, the access protocol packet in a packet queue of a to-be-newly-connected terminal when the forwarding plane determines that the access protocol packet is the authentication start packet; or placing, by the forwarding plane, the access protocol packet in a packet queue of the connected terminal when the forwarding plane determines that the access protocol packet is not the authentication start packet and the forwarding plane determines that the terminal served by the access protocol packet is the connected terminal; and scheduling, by the forwarding plane, the packet queue of the to-be-newly-connected terminal and the packet queue of the connected terminal according to respective priorities of the packet queue of the to-be-newly-connected terminal and the packet queue of the connected terminal, where the priority of the packet queue of the to-be-newly-connected terminal is different from the priority of the packet queue of the connected terminal.

The priority of the packet queue of the to-be-newly-connected terminal and the priority of the packet queue of the connected terminal are set according to an actual requirement, and then the queues are scheduled according to the priorities of the queues, which can improve user service experience. For example, the packet queue of the connected terminal may be scheduled preferentially, and in this way, a service of the connected terminal can be processed in a timely manner.

With reference to the first aspect or the first implementation of the first aspect, in second implementation of the first aspect, the item further includes an authentication status of the connected terminal, the authentication status is authentication uncompleted or authentication completed, the packet queue of the connected terminal includes an under-authentication packet queue and an authentication-completed packet queue, and a priority of the under-authentication packet queue is different from a priority of the authentication-completed packet queue; and the placing, by the forwarding plane, the access protocol packet in a packet queue of the connected terminal includes:

determining, by the forwarding plane, an authentication status of the terminal served by the access protocol packet; and placing, by the forwarding plane, the access protocol packet in the under-authentication packet queue when the authentication status of the terminal served by the access protocol packet is authentication uncompleted; or placing, by the forwarding plane, the access protocol packet in the authentication-completed packet queue when the authentication status of the terminal served by the access protocol packet is authentication completed.

The packet queue of the to-be-newly-connected terminal, the under-authentication packet queue, and the authentication-completed packet queue are set, and the priority of the packet queue of the to-be-newly-connected terminal, the priority of the under-authentication packet queue, and the priority of the authentication-completed packet queue are set according to an actual requirement; therefore, when the queues are scheduled according to the priorities of the queues, user service experience can be further improved.

With reference to any one of the first aspect, the first implementation of the first aspect, and the second implementation of the first aspect, in third implementation of the first aspect, the item further includes the authentication status of the connected terminal, and the authentication status is authentication uncompleted or authentication completed, and the method further includes:

when the forwarding plane determines that the access protocol packet is not the authentication start packet and the forwarding plane determines that the terminal served by the access protocol packet is the connected terminal, determining, by the forwarding plane, the authentication status of the terminal served by the access protocol packet; and discarding the access protocol packet when the authentication status of the terminal served by the access protocol packet is authentication uncompleted and when the forwarding plane determines that the access protocol packet is an online packet; or discarding the access protocol packet when the authentication status of the terminal served by the access protocol packet is authentication completed and when the forwarding plane determines that the access protocol packet is an authentication packet other than the authentication start packet.

Because an access protocol packet of a connected terminal whose service authentication status is authentication completed can be only an authentication start packet, an online packet, or an offline packet, and an access protocol packet of a connected terminal whose service authentication status is authentication uncompleted can be only an authentication packet or an offline packet, both an authentication packet that is other than the authentication start packet and that serves the connected terminal whose authentication status is authentication completed and an online packet that serves the connected terminal whose authentication status is authentication uncompleted are error packets or attack packets; after the error packets or the attack packets are discarded, user experience is further improved, and processing burden on the control plane is reduced.

With reference to any one of the first aspect, the first implementation of the first aspect, the second implementation of the first aspect, and the third implementation of the first aspect, in fourth implementation of the first aspect, the method further includes:

receiving, by the forwarding plane, an indication that is sent by the control plane, where the indication is used to indicate that a quantity of connected terminals whose authentication status is authentication uncompleted is greater than a preset quantity; and restricting, by the forwarding plane, a rate at which the authentication start packets are sent to the control plane.

When the quantity of connected terminals whose authentication status is authentication uncompleted is greater than the preset quantity, it indicates that processing burden on the control plane is heavy. In this case, the forwarding plane restricts the rate at which the authentication start packets are sent to the control plane, which can reduce the processing burden on the control plane.

According to a second aspect, a packet processing apparatus is provided, where the apparatus includes several units, such as a receiving unit and a processing unit, and the several units are configured to implement the method provided in the first aspect.

According to a third aspect, a packet processing device is provided, where the device includes a control plane apparatus and a forwarding plane apparatus, where the control plane apparatus is configured to send an item to the forwarding plane apparatus, where the item includes an identifier of a connected terminal; and the forwarding plane apparatus includes at least a memory, a processor, and a communication interface, where the memory is configured to store an instruction; the processor is configured to execute the instruction stored in the memory; the communication interface is configured to communicate with the control plane apparatus under the control of the processor; and the processor can implement, by executing the instruction stored in the memory, the method provided in the first aspect.

According to a fourth aspect, a computer-readable storage medium is provided, where the computer-readable storage medium is configured to store program code that is executed by the foregoing forwarding plane apparatus when the foregoing forwarding plane apparatus processes a packet, and the program code includes an instruction used to implement the method provided in the first aspect.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes implementation manners of the present invention in detail with reference to the accompanying drawings.

Figure 1:
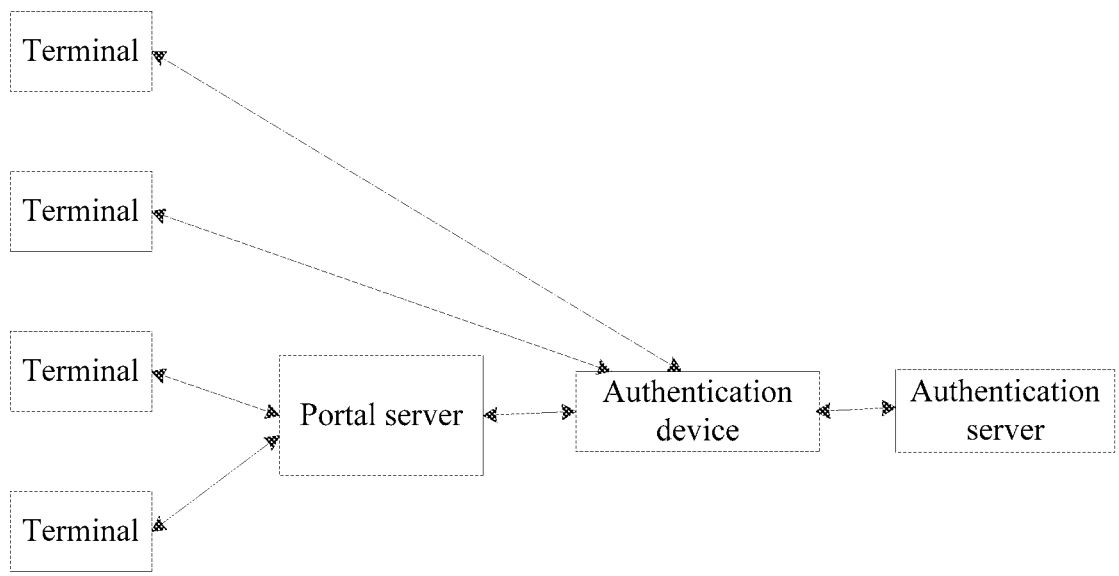
FIG. 1 is a schematic diagram of a network architecture of an authentication system according to an embodiment of the present invention.

For ease of understanding of the technical solutions provided in the embodiments of the present invention, a network architecture of an authentication system is first described with reference to FIG. 1. As shown in FIG. 1, a network device of the network architecture includes at least a terminal, an authentication device, and an authentication server. The authentication device is a network device that processes an access protocol packet between the terminal and the authentication server. For example, the authentication device may be a router or a network switch. The access protocol packet may be any one of a portal protocol packet, a PPPoE protocol packet, or an EAPOL packet.

If the access protocol packet is an EAPOL packet, the terminal communicates with the authentication device by using the EAPOL packet, and the authentication device communicates with the authentication server by using the Remote Authentication Dial-In User Service (RADIUS) protocol.

If the access protocol packet is a portal protocol packet, the network device of the network architecture further includes a portal server. The portal server is connected to both the authentication device and the terminal. For example, the portal server may be a personal computer, or may be a web application server; and the portal server has captive portal authentication software. The terminal communicates with the portal server by using the Hypertext Transfer Protocol (HTTP), and the authentication device communicates with the portal server by using a portal protocol.

Figure 2:
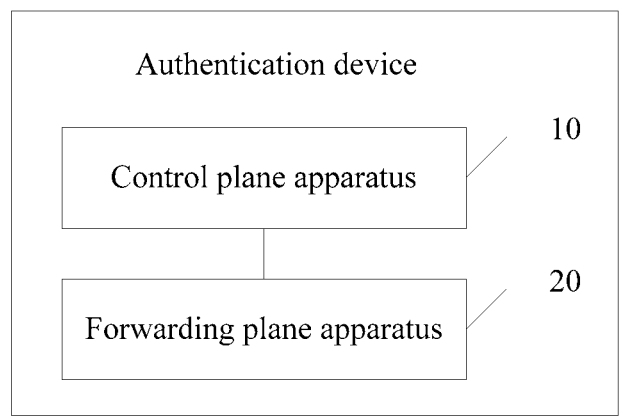
FIG. 2 is a schematic structural diagram of an authentication device according to an embodiment of the present invention.

FIG. 2 is a schematic diagram of a possible hardware structure of the authentication device shown in FIG. 1. As shown in FIG. 2, the authentication device includes a control plane apparatus 10 and a forwarding plane apparatus 20. The control plane apparatus 10 may be a control chip. For example, the control plane apparatus 10 may be implemented by a CPU, or may be implemented by a network processor (NP) with a control plane function. The forwarding plane apparatus 20 may be a switching chip. For example, the forwarding plane apparatus 20 may be implemented by an application-specific integrated circuit (ASIC), a programmable logic device (PLD), a network processor, a core that is in a multi-core CPU and that is used to implement a forwarding plane, or any combination thereof. The PLD may be a complex programmable logic device (CPLD), a field-programmable gate array (FPGA), a generic array logic (GAL), or any combination thereof.

The forwarding plane apparatus 20 is configured to implement the forwarding plane of the authentication device. An access protocol packet received by the authentication device is first processed by the forwarding plane apparatus 20. The forwarding plane apparatus 20 determines whether to send the access protocol packet to the control plane apparatus 10. The forwarding plane apparatus 20 maintains a terminal status table according to an item that is sent by the control plane apparatus 10. An entry of the terminal status table includes an identifier of a connected terminal in the item that is sent by the control plane apparatus 10. The control plane apparatus 10 may send multiple items. There may also be identifiers of multiple connected terminals in the item that is sent by the control plane apparatus 10. Correspondingly, a single entry of the terminal status table may store the identifiers of the multiple connected terminals, or the terminal status table may include multiple entries, and each entry stores an identifier of one connected terminal. The connected terminal refers to a terminal for which an authentication process has been started but authentication has not completed, or a terminal that has been authenticated and is being online. The forwarding plane apparatus 20 first determines whether the access protocol packet is an authentication start packet. The authentication start packet refers to an authentication packet that is used to start an authentication process for a terminal served by the authentication start packet. A terminal served by the access protocol packet refers to a terminal to which an authentication process involving the access protocol packet belongs. For example, an access protocol packet that is sent by a terminal for authenticating the terminal is an access protocol packet serving the terminal. For another example, an access protocol packet that indicates an authentication result of a terminal and that is sent by a server is an access protocol packet serving the terminal. If the access protocol packet is the authentication start packet, the forwarding plane apparatus 20 sends the access protocol packet to the control plane apparatus 10. Optionally, the forwarding plane apparatus 20 places the access protocol packet in a packet queue, and sends the access protocol packet to the control plane apparatus 10 after queue scheduling. The packet queue is used to store a packet that is sent by the forwarding plane apparatus 20 to the control plane apparatus 10. If the access protocol packet is not the authentication start packet, the forwarding plane apparatus 20 searches the terminal status table for an entry that matches the access protocol packet. When the forwarding plane apparatus 20 does not find the entry that matches the access protocol packet, the forwarding plane apparatus 20 discards the received access protocol packet. When the forwarding plane apparatus 20 finds the entry that matches the access protocol packet, the forwarding plane apparatus 20 sends the access protocol packet to the control plane apparatus 10. Optionally, the forwarding plane apparatus 20 places the access protocol packet in a packet queue, and sends the access protocol packet to the control plane apparatus 10 after queue scheduling. After receiving the access protocol packet that is sent by the forwarding plane apparatus 20, the control plane apparatus 10 processes the access protocol packet according to a corresponding access protocol. If the access protocol packet is the authentication start packet, after the control plane apparatus 10 processes the access protocol packet, the terminal served by the access protocol packet becomes a connected terminal. The control plane apparatus 10 sends an item that includes an identifier of the connected terminal to the forwarding plane apparatus 20.

The authentication device shown in FIG. 2 has both the forwarding plane apparatus and the control plane apparatus. In another possible hardware structure, a control plane may be implemented by an independent device. For example, in software-defined networking, the control plane may be implemented by a controller. The controller may control the forwarding plane apparatus by using a protocol (such as the OpenFlow protocol) that supports the software-defined networking. In this case, a combination of a device that independently implements the forwarding plane apparatus and a device that independently implements the control plane apparatus may also be considered as the authentication device.

In this embodiment of the present invention, the access protocol packet may be classified into an authentication packet, an online packet, or an offline packet. The authentication packet is a packet that is sent by a terminal or a server (for example, a portal server) to an authentication device in an authentication process. The authentication packet may be the authentication start packet, or may be an authentication packet other than the authentication start packet. The online packet and the offline packet are packets that are sent by a terminal or a server to an authentication device in an online process after authentication is completed. A difference between the online packet and the offline packet lies in that: the offline packet is used to implement going offline of the terminal, while the online packet is used to implement an online service of the terminal (for example, used to query traffic of the terminal).

Figures 3, 4:
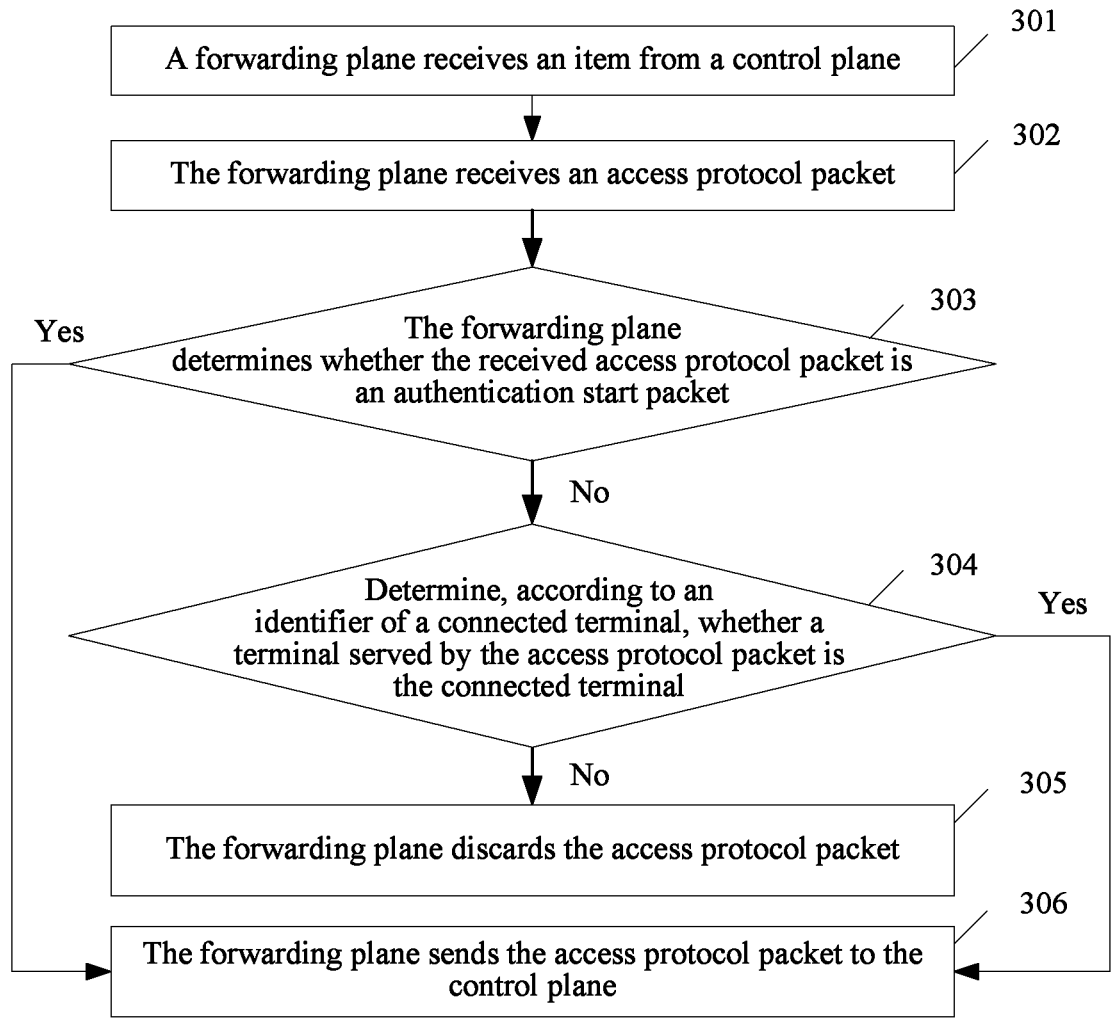
FIG. 3 is a flowchart of a packet processing method according to an embodiment of the present invention.
FIG. 4 is a schematic diagram of a format of an EAPOL packet according to an embodiment of the present invention.

FIG. 3 is a flowchart of a packet processing method according to an embodiment of the present invention. As shown in FIG. 3, the method includes the following steps:

Step 301. A forwarding plane receives an item from a control plane.

The forwarding plane may be implemented by the forwarding plane apparatus of the authentication device shown in FIG. 2. The control plane may be implemented by the control plane apparatus of the authentication device shown in FIG. 2.

The item includes an identifier of a connected terminal. The identifier of the connected terminal may be a Media Access Control (MAC) address or an Internet Protocol (IP) address of the connected terminal.

Optionally, the item that is sent by the control plane further includes an authentication status of the connected terminal, where the authentication status is authentication uncompleted or authentication completed.

After receiving the item, the forwarding plane stores the identifier and the authentication status of the connected terminal that are included in the item to a terminal status table. Specifically, the terminal status table includes several entries, and the identifier and the authentication status of the connected terminal are recorded in the entries.

When the control plane receives an authentication start packet, if it is determined that an authentication status of a terminal served by the authentication start packet is authentication uncompleted, the authentication status of the connected terminal in the item that is sent by the control plane to the forwarding plane is authentication uncompleted. If an authentication process is completed for the connected terminal subsequently, the control plane updates the authentication status of the connected terminal to authentication completed, and then sends, to the forwarding plane, an item in which the authentication status is updated, where the authentication status of the connected terminal in the item is authentication completed. Further, if the connected terminal restarts the authentication process subsequently, the control plane updates the authentication status of the connected terminal to authentication uncompleted, and then sends, to the forwarding plane, an item in which the authentication status is updated, where the authentication status of the connected terminal in the item is authentication uncompleted.

Optionally, the control plane also monitors in real time a quantity of connected terminals whose authentication status is authentication uncompleted. When the quantity of connected terminals whose authentication status is authentication uncompleted is greater than a preset quantity, the control plane sends an indication to the forwarding plane, where the indication is used to indicate that the quantity of connected terminals whose authentication status is authentication uncompleted is greater than the preset quantity. On this basis, step 301 may further include: the forwarding plane receives the indication that is sent by the control plane.

In implementation, the preset quantity may be estimated according to a performance parameter of the control plane. If the quantity of connected terminals whose authentication status is authentication uncompleted is greater than the preset quantity, burden on the control plane reaches or is close to a processing capability upper limit.

Optionally, when the quantity of connected terminals whose authentication status is authentication uncompleted decreases to a preset range, the control plane sends another indication to the forwarding plane, where the another indication is used to indicate that the quantity of connected terminals whose authentication status is authentication uncompleted decreases to the preset range. Step 301 further includes: the forwarding plane receives the another indication that is sent by the control plane. In implementation, an upper limit of the preset range may be the foregoing preset quantity, or may be set to a value less than the foregoing preset quantity.

Step 302. The forwarding plane receives an access protocol packet.

Optionally, after the forwarding plane receives the indication that is sent by the control plane, step 302 further includes: the forwarding plane restricts a rate at which authentication start packets are sent to the control plane.

When restriction is to be performed on the rate at which the authentication start packets are sent to the control plane, a quantity or a data volume of authentication start packets that are sent to the control plane per unit time may be restricted.

When the quantity of connected terminals whose authentication status is authentication uncompleted is greater than the preset quantity, it indicates that the burden on the control plane reaches or is close to the processing capability upper limit. In this case, the forwarding plane restricts the rate at which the authentication start packets are sent to the control plane, so that an increase of processing burden on the control plane is controlled, and the control plane can process an online process of the connected terminal.

Optionally, after the forwarding plane receives the another indication that is sent by the control plane, step 302 further includes: cancel restriction on the rate at which the authentication start packets are sent to the control plane.

Step 303. The forwarding plane determines whether the received access protocol packet is an authentication start packet.

When the received access protocol packet is not the authentication start packet, step 304 is performed. When the received access protocol packet is the authentication start packet, step 306 is performed.

Optionally, the access protocol packet includes a field that is used to indicate a type of the access protocol packet. The forwarding plane may identify the type of the access protocol packet according to the field, so as to determine whether the access protocol packet is the authentication start packet. The type of the access protocol packet includes an authentication start packet, an authentication packet other than the authentication start packet, an online packet, and an offline packet. FIG. 4 shows a format of an EAPOL packet. In the EAPOL packet, as shown in FIG. 4, a Port Access Entity (PAE) Ethernet type field represents a protocol type; a protocol version field represents a protocol version number that is supported by a sender of the EAPOL packet; a packet body field is used to carry a data frame of the EAPOL packet; a type field represents a type of the data frame; and a length field represents a data length, that is, a length of the data frame body field. Values of the type field indicate different types of data frames. The type field may be used to indicate the type of the access protocol packet. For example, when a value of the type field of the EAPOL packet is 1 (or is represented as 0x01), the type of the data frame is an authentication start frame, where an indicated type of the EAPOL packet is an authentication start packet.

Step 304. The forwarding plane determines, according to an identifier of a connected terminal, whether a terminal served by the access protocol packet is the connected terminal.

When it is determined that the terminal served by the access protocol packet is not the connected terminal, that is, when the terminal served by the access protocol packet is a to-be-newly-connected terminal, step 305 is performed. When it is determined that the terminal served by the access protocol packet is the connected terminal, step 306 is performed.

Optionally, the forwarding plane determines, according to an access protocol to which the access protocol packet belongs, the terminal served by the access protocol packet. For example, when the received access protocol packet is an EAPOL packet, an identifier of the terminal served by the access protocol packet is a source MAC address of the EAPOL packet. When the received access protocol packet is a portal protocol packet, an identifier of the terminal served by the access protocol packet is an IP address, included in the portal protocol packet, of the terminal served by the access protocol packet.

Optionally, the forwarding plane performs matching, in an entry of the terminal status table, with the identifier of the terminal served by the access protocol packet. If the identifier of the terminal served by the access protocol packet is found by matching in the entry, it is determined that the terminal served by the access protocol packet is the connected terminal. If the identifier of the terminal served by the access protocol packet is not found by matching in the entry, it is determined that the terminal served by the access protocol packet is not the connected terminal.

Step 305. The forwarding plane discards the access protocol packet.

Generally, an access protocol packet that is sent by a terminal or a server to the authentication device is a normal packet, such as the authentication start packet that is sent by the to-be-newly-connected terminal to the authentication device, or an offline packet that is sent by the connected terminal to the authentication device. If the terminal or the server has an error, or the authentication device is attacked, the access protocol packet received by the authentication device may be an error packet or an attack packet. For example, the error packet or the attack packet may be an online packet or an offline packet that serves the to-be-newly-connected terminal. In a conventional technology, a forwarding plane does not differentiate a terminal served by an access protocol packet and a type of the access protocol packet, but sends all received access protocol packets to a control plane for processing. If there are sufficient error packets or attack packets, a processing capability of the control plane may be fully occupied. In this embodiment of the present invention, when the access protocol packet is not the authentication start packet and the terminal served by the access protocol packet is the to-be-newly-connected terminal, the forwarding plane determines that the access protocol packet is an attack packet or an error packet, and discards the access protocol packet, which not only can improve user experience, but also can reduce processing burden on the control plane.

Step 306. The forwarding plane sends the access protocol packet to the control plane.

Optionally, the forwarding plane may send the access protocol packet to the control plane according to a sequence in which access protocol packets are received, that is, first send an access protocol packet that is received first, and then send an access protocol packet that is received later. For example, the forwarding plane may place the access protocol packet in a packet queue, and the packet queue is a first-in, first-out (FIFO) queue. After queue scheduling, the forwarding plane sends the access protocol packet to the control plane.

Optionally, when the forwarding plane determines that the access protocol packet is the authentication start packet, the forwarding plane places the access protocol packet in a packet queue of the to-be-newly-connected terminal. When the forwarding plane determines that the access protocol packet is not the authentication start packet and that the terminal served by the access protocol packet is the connected terminal, the forwarding plane places the access protocol packet in a packet queue of the connected terminal. The forwarding plane then schedules the packet queue of the to-be-newly-connected terminal and the packet queue of the connected terminal according to respective priorities of the packet queue of the to-be-newly-connected terminal and the packet queue of the connected terminal. The priority of the packet queue of the to-be-newly-connected terminal is different from the priority of the packet queue of the connected terminal.

Optionally, the priority of the packet queue of the to-be-newly-connected terminal is lower than the priority of the packet queue of the connected terminal. If there are a small quantity of access protocol packets to be sent by the forwarding plane to the control plane, both an access protocol packet in the packet queue of the to-be-newly-connected terminal and an access protocol packet in the packet queue of the connected terminal may be smoothly sent to the control plane. If there are a large quantity of access protocol packets to be sent by the forwarding plane to the control plane, the forwarding plane schedules packets in multiple queues according to priorities of the queues, and the access protocol packet in the packet queue of the connected terminal is sent to the control plane preferentially. If the packet queue of the to-be-newly-connected terminal is fully occupied, the access protocol packet in the packet queue of the to-be-newly-connected terminal or an access protocol packet that is to be placed in the packet queue of the to-be-newly-connected terminal may be discarded.

In implementation, the priority of the packet queue of the to-be-newly-connected terminal and the priority of the packet queue of the connected terminal may be set according to an actual requirement, and then the queues are scheduled according to the priorities of the queues, which can improve user service experience. For example, the packet queue of the connected terminal may be scheduled preferentially, and in this way, a service of the connected terminal can be processed in a timely manner.

Optionally, the packet queue of the connected terminal includes an under-authentication packet queue and an authentication-completed packet queue. A priority of the under-authentication packet queue is different from a priority of the authentication-completed packet queue.

That the forwarding plane places the received access protocol packet in the packet queue of the connected terminal may specifically include: the forwarding plane determines an authentication status of the terminal served by the access protocol packet; and when the authentication status of the terminal served by the access protocol packet is authentication uncompleted, the forwarding plane places the access protocol packet in the under-authentication packet queue; or when the authentication status of the terminal served by the access protocol packet is authentication completed, the forwarding plane places the access protocol packet in the authentication-completed packet queue.

Generally, when authentication on a terminal is not completed, a normal packet that is sent by the terminal or a server to the authentication device is an authentication packet other than an authentication start packet or an offline packet. After the authentication on the terminal is completed, a normal packet that is sent by the terminal or the server to the authentication device is an online packet or an offline packet. If the terminal or the server has an error, or the authentication device is attacked, an access protocol packet received by the authentication device may be an error packet or an attack packet. For example, the error packet or the attack packet may be an online packet that serves the terminal on which the authentication is not completed. The error packet or the attack packet may also be an authentication packet that is other than an authentication start packet and that serves the terminal on which the authentication is completed. Optionally, the forwarding plane may discard this type of packet, which further improves user experience, and reduces processing burden on a control plane.

For example, when the authentication status of the terminal served by the access protocol packet is authentication uncompleted, the forwarding plane determines whether the access protocol packet is an authentication packet other than the authentication start packet or an offline packet. When the access protocol packet is an online packet, the access protocol packet is discarded. When the access protocol packet is an authentication packet other than the authentication start packet or an offline packet, the forwarding plane places the access protocol packet in the under-authentication packet queue. When the authentication status of the terminal served by the access protocol packet is authentication completed, the forwarding plane determines whether the access protocol packet is an online packet or an offline packet. When the access protocol packet is an authentication packet other than the authentication start packet, the access protocol packet is discarded. When the access protocol packet is an online packet or an offline packet, the forwarding plane places the access protocol packet in the authentication-completed packet queue.

Optionally, the priority of the packet queue of the to-be-newly-connected terminal, the priority of the under-authentication packet queue, and the priority of the authentication-completed packet queue are in ascending order. Specifically, when there are packets in the packet queue of the to-be-newly-connected terminal, the under-authentication packet queue, and the authentication-completed packet queue, the forwarding plane preferentially sends packets in the authentication-completed packet queue to the control plane till all the packets in the authentication-completed packet queue are sent, and then the forwarding plane sends packets in the under-authentication packet queue to the control plane. The forwarding plane sends packets in the packet queue of the to-be-newly-connected terminal to the control plane only after all the packets in the authentication-completed packet queue and the under-authentication packet queue are sent. If there are a small quantity of access protocol packets to be sent by the forwarding plane to the control plane, access protocol packets in the packet queue of the to-be-newly-connected terminal, the under-authentication packet queue, and the authentication-completed packet queue may all be smoothly sent to the control plane. If there are a large quantity of access protocol packets to be sent by the forwarding plane to the control plane, the access protocol packet in the authentication-completed packet queue is preferentially sent to the control plane. If the under-authentication packet queue is fully occupied, the access protocol packet in the under-authentication packet queue or an access protocol packet that is to be placed in the under-authentication packet queue may be discarded. Similarly, if the packet queue of the to-be-newly-connected terminal is fully occupied, the access protocol packet in the packet queue of the to-be-newly-connected terminal or an access protocol packet that is to be placed in the packet queue of the to-be-newly-connected terminal may be discarded.

The packet queue of the to-be-newly-connected terminal, the under-authentication packet queue, and the authentication-completed packet queue are set, and the priority of the packet queue of the to-be-newly-connected terminal, the priority of the under-authentication packet queue, and the priority of the authentication-completed packet queue are set according to an actual requirement; therefore, when the queues are scheduled according to the priorities of the queues, user service experience can be further improved.

In this embodiment of the present invention, a forwarding plane may obtain an identifier of a connected terminal by receiving an item from a control plane; the forwarding plane receives an access protocol packet; when the forwarding plane determines that the access protocol packet is not an authentication start packet, the forwarding plane determines, according to the identifier of the connected terminal, whether a terminal served by the received access protocol packet is the connected terminal; when the terminal served by the access protocol packet is not the connected terminal, the access protocol packet is discarded. Because an access protocol packet serving a to-be-newly-connected terminal can be only the authentication start packet, when the access protocol packet is not the authentication start packet and the terminal served by the access protocol packet is not the connected terminal, that is, the terminal served by the access protocol packet is the to-be-newly-connected terminal, it is determined that the access protocol packet is an error packet or an attack packet, and the access protocol packet is discarded. Compared with random discarding of a packet, this method not only reduces processing burden on the control plane, but also avoids undesirable impact on a user, and therefore, user service experience can be improved.

It should be noted that when the packet processing apparatus provided in the foregoing embodiment processes a packet, division of the foregoing functional modules is used as an example for illustration. In actual application, the foregoing functions can be allocated to different functional modules and implemented according to a requirement, that is, an inner structure of a device is divided into different functional modules to implement all or part of the functions described above. In addition, the packet processing apparatus provided in the foregoing embodiment and the packet processing method embodiment belong to a same idea, and for a specific implementation process thereof, reference may be made to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A packet processing method comprising:
   receiving, by a forwarding plane, an identifier of a connected terminal from a control plane of the forwarding plane, wherein the connected terminal is a terminal for which an authentication process has been started but not yet completed;

receiving, by the forwarding plane, a first authentication packet;

determining, by the forwarding plane, a category of the first authentication packet based on a field within the first authentication packet, wherein the category is one of (a) an authentication start packet for starting an authentication process, (b) an authentication packet other than the authentication start packet, (c) an online packet, and (d) an offline packet;

when the first authentication packet is not categorized as the authentication start packet, determining, by the forwarding plane according to the identifier of the connected terminal, whether a terminal served by the first authentication packet is the connected terminal;

discarding, by the forwarding plane, the first authentication packet when the category of the first authentication packet is not the authentication start packet and the terminal served by the first authentication packet is not the connected terminal;

placing, by the forwarding plane, the first authentication packet in a packet queue of a to-be-newly-connected terminal or a packet queue of the connected terminal, wherein
the first authentication packet is placed in the packet queue of the to-be-newly-connected terminal when the category of the first authentication packet is determined to be the authentication start packet, and
the first authentication packet is placed in the packet queue of the connected terminal when (a) the category of the first authentication packet is not the authentication start packet and (b) the terminal served by the first authentication packet is the connected terminal;

scheduling, by the forwarding plane, the packet queue of the to-be-newly-connected terminal or the connected terminal according to a priority of the packet queue, wherein the priority of the packet queue of the to-be-newly-connected terminal is lower than the priority of the packet queue of the connected terminal;

sending, by the forwarding plane, the first authentication packet to the control plane according to the scheduling when the category of the first authentication packet is determined to be the authentication start packet, wherein the terminal served by the first authentication packet becomes the connected terminal after the control plane processes the first authentication packet;

receiving, by the forwarding plane and from the control plane, an indication that a quantity of connected terminals whose authentication status is incomplete is greater than a preset quantity; and restricting, by the forwarding plane, a rate of sending to the control plane authentication packets whose category is the authentication start packet in response to receiving the indication.

2. The method according to claim 1, wherein the identifier further comprises an authentication status of the connected terminal and the authentication status indicates whether the authentication process is incomplete or complete, the packet queue of the connected terminal comprises an under-authentication packet queue and an authentication-completed packet queue, and a priority of the under-authentication packet queue is different from a priority of the authentication-completed packet queue; and placing, by the forwarding plane, the first authentication packet in a packet queue of the connected terminal comprises:
determining, by the forwarding plane, an authentication status of the terminal served by the first authentication packet; and
placing, by the forwarding plane, the first authentication packet
a) in the under-authentication packet queue when the authentication status of the terminal served by the first authentication packet is authentication uncompleted; or
b) in the authentication-completed packet queue when the authentication status of the terminal served by the first authentication packet is authentication completed.

3. The method according to claim 1, wherein the identifier further comprises an authentication status of the connected terminal and the authentication status indicates whether the authentication process is incomplete or complete, and the method further comprises:
when the forwarding plane determines that the category of the first authentication packet is not the authentication start packet and the forwarding plane determines that the terminal served by the identifier is the connected terminal, determining, by the forwarding plane, the authentication status of the terminal served by the first authentication packet; and
discarding the first authentication packet when the authentication status of the terminal served by the first authentication packet is
a) authentication uncompleted and when the forwarding plane determines that the first authentication packet is an online packet; or
b) authentication completed and when the forwarding plane determines that the first authentication packet is an authentication packet other than the authentication start packet.

4. A packet processing apparatus comprising a processor and a non-transitory computer-readable medium having processor-executable instructions stored thereon, wherein the processor is configured, based on execution of the processor-executable instructions, to facilitate:
receiving an identifier of a connected terminal from a control plane and receiving an authentication packet, wherein the connected terminal is a terminal for which an authentication process has been started but not yet completed;
receiving a first authentication packet;
determining a category of the first authentication packet based on a field within the first authentication packet, wherein the category is one of (a) an authentication start packet for starting an authentication process, (b) an authentication packet other than the authentication start packet, (c) an online packet, and (d) an offline packet;
when the authentication packet is not categorized as the authentication start packet, determining, according to the identifier of the connected terminal, whether a terminal served by the authentication packet is the connected terminal;
discarding the authentication packet when the category of the authentication packet is not the authentication start packet and the terminal served by the authentication packet is not the connected terminal;

placing the first authentication packet in a packet queue of a to-be-newly-connected terminal or a packet queue of the connected terminal, wherein
the first authentication packet is placed in the packet queue of the to-be-newly-connected terminal when the category of the first authentication packet is determined to be the authentication start packet, and
the first authentication packet is placed in the packet queue of the connected terminal when (a) the category of the first authentication packet is not the authentication start packet and (b) the terminal served by the first authentication packet is the connected terminal;
scheduling the packet queue of the to-be-newly-connected terminal or the connected terminal according to a priority of the packet queue, wherein the priority of the packet queue of the to-be-newly-connected terminal is lower than the priority of the packet queue of the connected terminal;
sending the first authentication packet to the control plane according to the scheduling when the category of the first authentication packet is determined to be the authentication start packet, wherein the terminal served by the first authentication packet becomes the connected terminal after the control plane processes the first authentication packet;
receiving from the control plane an indication that a quantity of connected terminals whose authentication status is incomplete is greater than a preset quantity; and
restricting a rate of sending to the control plane authentication packets whose category is the authentication start packet in response to receiving the indication.

5. The apparatus according to claim 4, wherein the identifier further comprises an authentication status of the connected terminal, and the authentication status indicates whether the authentication process is incomplete or complete, the packet queue of the connected terminal comprises an under-authentication packet queue and an authentication-completed packet queue, and a priority of the under-authentication packet queue is different from a priority of the authentication-completed packet queue; and the processor is further configured, based on execution of the processor-executable instructions, to facilitate:
placing the first authentication packet in a packet queue of the connected terminal comprises:
determining an authentication status of the terminal served by the first authentication packet; and
placing, by the forwarding plane, the first authentication packet
a) in the under-authentication packet queue when the authentication status of the terminal served by the first authentication packet is authentication uncompleted; or
b) in the authentication-completed packet queue when the authentication status of the terminal served by the first authentication packet is authentication completed.

6. The apparatus according to claim 4, wherein the identifier further comprises an authentication status of the connected terminal and the authentication status indicates whether the authentication process is incomplete or complete, and the processor is further configured, based on execution of the processor-executable instructions, to facilitate:
determining the authentication status of the terminal served by the first authentication packet when the category of the first authentication packet is not the authentication start packet and the terminal served by the identifier is the connected terminal; and
discarding the first authentication packet when the authentication status of the terminal served by the first authentication packet is
a) authentication uncompleted and when the forwarding plane determines that the first authentication packet is an online packet; or
b) authentication completed and when the forwarding plane determines that the first authentication packet is an authentication packet other than the authentication start packet.

7. A packet processing device comprising a control plane apparatus and a forwarding plane apparatus;
wherein the control plane apparatus is configured to
send an identifier of a connected terminal to the forwarding plane apparatus, wherein the connected terminal is a terminal for which an authentication process has been started but not yet completed; and
wherein the forwarding plane apparatus is configured to:
receive the identifier from the control plane apparatus and receive an authentication packet;
determine a category of the first authentication packet based on a field within the first authentication packet, wherein the category is one of (a) an authentication start packet for starting an authentication process, (b) an authentication packet other than the authentication start packet, (c) an online packet, and (d) an offline packet;
when the authentication packet is not categorized as the authentication start packet, determine, according to the identifier of the connected terminal, whether a terminal served by the authentication packet is the connected terminal;
discard the authentication packet when the category of the authentication packet is not the authentication start packet and the terminal served by the authentication packet is not the connected terminal;
place the authentication packet in a packet queue of a to-be-newly-connected terminal or a packet queue of the connected terminal, wherein
the authentication packet is placed in the packet queue of the to-be-newly-connected terminal when the category of the authentication packet is determined to be the authentication start packet, and
the authentication packet is placed in the packet queue of the connected terminal when (a) the category of the authentication packet is not the authentication start packet and (b) the terminal served by the authentication packet is the connected terminal;
schedule the packet queue of the to-be-newly-connected terminal or the connected terminal according to a priority of the packet queue, wherein the priority of the packet queue of the to-be-newly-connected terminal is lower than the priority of the packet queue of the connected terminal;
send the authentication packet to the control plane according to the scheduling when the category of the authentication packet is determined to be the authentication start packet, wherein the terminal served by the authentication packet becomes the connected terminal after the control plane processes the authentication packet;

receive from the control plane an indication that a quantity of connected terminals whose authentication status is incomplete is greater than a preset quantity; and restrict a rate of sending to the control plane authentication packets whose category is the authentication start packet in response to receiving the indication.

8. The device according to claim 7, wherein the identifier further comprises an authentication status of the connected terminal and the authentication status indicates whether the authentication process is incomplete or complete, the packet queue of the connected terminal comprises an under-authentication packet queue and an authentication-completed packet queue, and a priority of the under-authentication packet queue is different from a priority of the authentication-completed packet queue, wherein the forwarding plane is further configured to provide at least the following operations:

placing the first authentication packet in a packet queue of the connected terminal comprises:
  determining an authentication status of the terminal served by the first authentication packet; and
  placing the first authentication packet
    a) in the under-authentication packet queue when the authentication status of the terminal served by the first authentication packet is authentication uncompleted; or
    b) in the authentication-completed packet queue when the authentication status of the terminal served by the first authentication packet is authentication completed.

9. The device according to claim 7, wherein the identifier further comprises an authentication status of the connected terminal and the authentication status indicates whether the authentication process is incomplete or complete, wherein the forwarding plane is further configured to provide at least the following operations:

determining the authentication status of the terminal served by the first authentication packet when the category of the first authentication packet is not the authentication start packet and the terminal served by the identifier is the connected terminal; and discarding the first authentication packet when the authentication status of the terminal served by the first authentication packet is
  a) authentication uncompleted and when the forwarding plane determines that the first authentication packet is an online packet; or
  b) authentication completed and when the forwarding plane determines that the first authentication packet is an authentication packet other than the authentication start packet.

* * * * *